United States Patent
Zhu (10) Patent No.: US 12,295,032 B2
(45) Date of Patent: May 6, 2025

(54) CHANNEL DETECTION METHOD AND APPARATUS FOR SHARED SPECTRUM AND STORAGE MEDIUM

(71) Applicant: Beijing Xiaomi Mobile Software Co., Ltd., Beijing (CN)

(72) Inventor: Yajun Zhu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 722 days.

(21) Appl. No.: 17/596,925

(22) PCT Filed: Jun. 26, 2019

(86) PCT No.: PCT/CN2019/093077
§ 371 (c)(1),
(2) Date: Dec. 21, 2021

(87) PCT Pub. No.: WO2020/258088
PCT Pub. Date: Dec. 30, 2020

(65) Prior Publication Data
US 2022/0322429 A1 Oct. 6, 2022

(51) Int. Cl.
*H04W 4/00* (2018.01)
*H04B 17/382* (2015.01)
(Continued)

(52) U.S. Cl.
CPC ...... *H04W 74/0808* (2013.01); *H04B 17/382* (2015.01); *H04W 16/14* (2013.01); *H04W 24/02* (2013.01); *H04W 48/16* (2013.01)

(58) Field of Classification Search
CPC . H04W 74/0808; H04W 24/02; H04W 16/14; H04W 48/16; H04B 17/382
(Continued)

(56) References Cited

U.S. PATENT DOCUMENTS

2017/0223739 A1* 8/2017 Mallik ............. H04W 74/0808
2020/0205020 A1* 6/2020 Nam .................... H04W 48/12
(Continued)

FOREIGN PATENT DOCUMENTS

CN 105207754 A 12/2015
CN 105282958 A 1/2016
(Continued)

OTHER PUBLICATIONS

"On wideband operation for NR-U," Proceedings of the 3GPP TSG RAN WG1 #97, R1-1906435, May 13, 2019, Reno, Nevada, 4 pages.

*Primary Examiner* — Temica M Beamer
(74) *Attorney, Agent, or Firm* — McCoy Russell LLP (57) ABSTRACT

Disclosed is a channel detection method for a shared spectrum, which falls within the technical field of wireless communications. The method is executed by a first base station, and the method comprises: acquiring channel occupation information sent by a second base station, wherein the channel occupation indication information is used for indicating an occupation time period when the second base station successfully occupies a shared spectrum; and suspending, within the occupation time period, channel detection for shared spectrum resources occupied by the second base station. According to the solution disclosed, when a base station determines that another base station is occupying the shared spectrum, the base station does not perform channel detection on the occupied shared spectrum resources, thereby reducing unnecessary shared spectrum detection, and reducing the power consumption of the base station.

20 Claims, 4 Drawing Sheets

---

Acquire channel occupancy indication information sent by a second base station, the channel occupancy indication information being used for indicating an occupancy time period in which the second base station successfully occupies an shared spectrum — 201

Suspend, in the occupancy time period, channel detection on an shared spectrum resource occupied by the second base station — 202

(51) Int. Cl.
*H04W 16/14* (2009.01)
*H04W 24/02* (2009.01)
*H04W 48/16* (2009.01)
*H04W 74/0808* (2024.01)

(58) Field of Classification Search
USPC .......................................................... 370/329
See application file for complete search history.

(56) References Cited

U.S. PATENT DOCUMENTS

2020/0314891 A1* 10/2020 Li ........................ H04W 74/006
2020/0351818 A1* 11/2020 Park ........................ H04W 4/90

FOREIGN PATENT DOCUMENTS

| CN | 106304091 A | 1/2017 |
| CN | 106658718 A | 5/2017 |
| CN | 109716830 A | 5/2019 |
| CN | 109863807 A | 6/2019 |

* cited by examiner

FIG. 1

Acquire channel occupancy indication information sent by a second base station, the channel occupancy indication information being used for indicating an occupancy time period in which the second base station successfully occupies an shared spectrum — 201

Suspend, in the occupancy time period, channel detection on an shared spectrum resource occupied by the second base station — 202

CHANNEL DETECTION METHOD AND APPARATUS FOR SHARED SPECTRUM AND STORAGE MEDIUM

CROSS REFERENCE TO RELATED APPLICATIONS

The present application is a U.S. National Phase of International Application No. PCT/CN2019/093077 entitled "CHANNEL DETECTION METHOD AND APPARATUS FOR UNLICENSED CHANNEL, AND STORAGE MEDIUM," and filed on Jun. 26, 2019. The entire contents of the above-listed application is hereby incorporated by reference for all purposes.

TECHNICAL FIELD

The present disclosure relates to the technical field of wireless communication, and in particular to a channel detection method and apparatus for a shared spectrum and a storage medium.

BACKGROUND AND SUMMARY

In the field of wireless communication, a shared spectrum can be used by means of a license assisted access (LAA) mechanism, that is, a terminal or base station can be used on the shared spectrum with the assistance of a licensed frequency band.

However, a listen before talk (LBT) mechanism is introduced into the LAA to ensure the coexistence with other systems on an unlicensed frequency band, such as a wireless fidelity (WiFi) system, so when a sending end needs to send data on the shared spectrum, and it is necessary to check whether the shared spectrum is idle. Only when the shared spectrum is idle, can the sending end send the data.

The present disclosure provides a channel detection method and apparatus for a shared spectrum and a storage medium. The technical solution is as follows:

A first aspect of the examples of the present disclosure provides a channel detection method for a shared spectrum. The channel detection method is executed by a first base station and comprises: acquiring channel occupancy indication information sent by a second base station, the channel occupancy indication information being used for indicating an occupancy time period in which the second base station successfully occupies the shared spectrum; and suspending, in the occupancy time period, channel detection on a shared spectrum resource occupied by the second base station.

A second aspect of the examples of the present disclosure provides a channel detection method for a shared spectrum. The channel detection method is executed by a second base station, and comprises: sending channel occupancy indication information to a first base station, the channel occupancy indication information being used for indicating an occupancy time period in which the second base station successfully occupies the shared spectrum.

A third aspect of the examples of the present disclosure provides a channel detection apparatus for a shared spectrum. The channel detection apparatus is used in a first base station, the apparatus comprises: one or more processors, and a non-transitory computer-readable storage medium for storing instructions executable by the one or more processors, wherein the one or more processors are configured to acquire channel occupancy indication information sent by a second base station, the channel occupancy indication information being used for indicating an occupancy time period in which the second base station successfully occupies the shared spectrum; and suspend, in the occupancy time period, channel detection on a shared spectrum resource occupied by the second base station.

A fourth aspect of the examples of the present disclosure provides a channel detection apparatus for a shared spectrum, wherein the apparatus is used in a second base station, and the apparatus comprises: one or more processors, and a non-transitory computer-readable storage medium for storing instructions executable by the one or more processors, wherein the one or more processors are configured to perform the channel detection method for a shared spectrum according to the second aspect.

A fifth aspect of the examples of the present disclosure provides a non-transitory computer readable storage medium, storing a computer-executable instructions that, when executed by one or more computer processors, causing the one or more computer processors to perform the channel detection method for a shared spectrum according to the first aspect.

It should be understood that the above general description and the following detailed description are only examples of the present disclosure, and cannot limit the present disclosure.

BRIEF DESCRIPTION OF THE FIGURES

The accompanying drawings herein, which are incorporated in the specification as a constituent part of the present specification, illustrate the examples satisfying the present disclosure and are used to explain the principles of the present disclosure together with the specification.

DETAILED DESCRIPTION

The examples will be described in detail herein and shown in the accompanying drawings exemplarily. When the following descriptions relate to the accompanying drawings, unless otherwise specified, the same numeral in different accompanying drawings denotes the same or similar element. The implementations described in the following examples do not denote all implementations consistent with the present disclosure. On the contrary, they are merely examples of an apparatus and a method consistent with some aspects of the present disclosure.

It should be understood that as used herein, "several" means one or more, and "a plurality of" means two or more. When describing an association relation of associated objects, "and/or" means that there may be three relations, for example, A and/or B, which may mean that A exists independently, A and B exist at the same time, or B exists independently. The character "/" generally means an "or" relation between two associated context objects. For convenience of understanding, some nouns and application scenarios related to the present disclosure are briefly introduced below.

Countries around the world establish special management institutions and introduce special policies and regulations for a radio-frequency spectrum, so as to achieve unified plan and management on the radio-frequency spectrum, because a radio-frequency spectrum resource is limited and non-renewable. Most of the countries conduct spectrum management by using a fixed spectrum allocation strategy that a spectrum resource is managed by a responsible government department and allocated to a fixed licensed user, ensuring that too much mutual interference between users can avoided and the spectrum resource can be better used. The spectrum resource may be divided into two types of a licensed spectrum and a shared spectrum.

The licensed spectrum is strictly limited and protected and only allows access of the licensed user and a device in conformity with a specification, and the user usually pays for the access. Communication of devices in public security, railway, civil aviation, radio and television, telecommunications and other important departments operates on the licensed spectrum so these departments all have a certain licensed spectra. Particularly in the telecom industry, mobile phones used everyday by people conduct communication by means of a licensed spectrum of an operator, and all operators have special frequency bands licensed by radio management units or departments of all the countries, so as to prevent public mobile communication from being interfered.

The shared spectrum allows access and usage of devices meeting some specifications and standards but must ensure no interference on other users. As a typical example, wireless fidelity (Wi-Fi), Bluetooth (BT) and other communication technologies conduct transmission by means of the shared spectrum. Moreover, the ITU Radiocommunication Sector defined an industrial scientific medical (ISM) frequency band as that the frequency band mainly allows usage of industrial, scientific and medical mechanisms without any license, and meanwhile needs to meet some emission power requirements and does not interfere with other frequency bands.

New-generation augmented reality (AR)/virtual reality (VR), vehicle-vehicle communication and other new internet applications require a higher-level wireless communication technology, promoting continuous evolution of the wireless communication technology to meet needs of the applications. Now a cellular mobile communication technology is at an evolution stage of a new-generation technology. An important characteristic of the new-generation technology is to support flexible configurations of various service types. The different service types have different requirements on the wireless communication technology, for example, an enhanced mobile broadband (eMBB) service type mainly requires a large bandwidth, a high speed, etc., an ultra reliable low latency communications (URLLC) service type mainly requires high reliability and low latency, and a service type of a massive machine type of communication (mMTC) mainly requires a large linking number, so a new-generation wireless communication system requires a flexible and configurable design to support transmission of various service types. Increase in service requirements causes a result that only a licensed spectrum cannot meet the service requirements, so it is considered that a mobile network is arranged on an unlicensed frequency band. For example, the 3rd Generation Partnership Project (3GPP) organized and adopted a 5G research project "Study on NR-based Access to Shared spectrum (NR-U)" to extend a fifth-generation (5G) technology (also called a new radio (NR) technology) to the unlicensed frequency band, and aims to enable NR to meet a regulation of the unlicensed frequency band and be capable of ensuring the peaceful coexistence with other access technologies working the unlicensed frequency band through research on the project.

Figure 1:
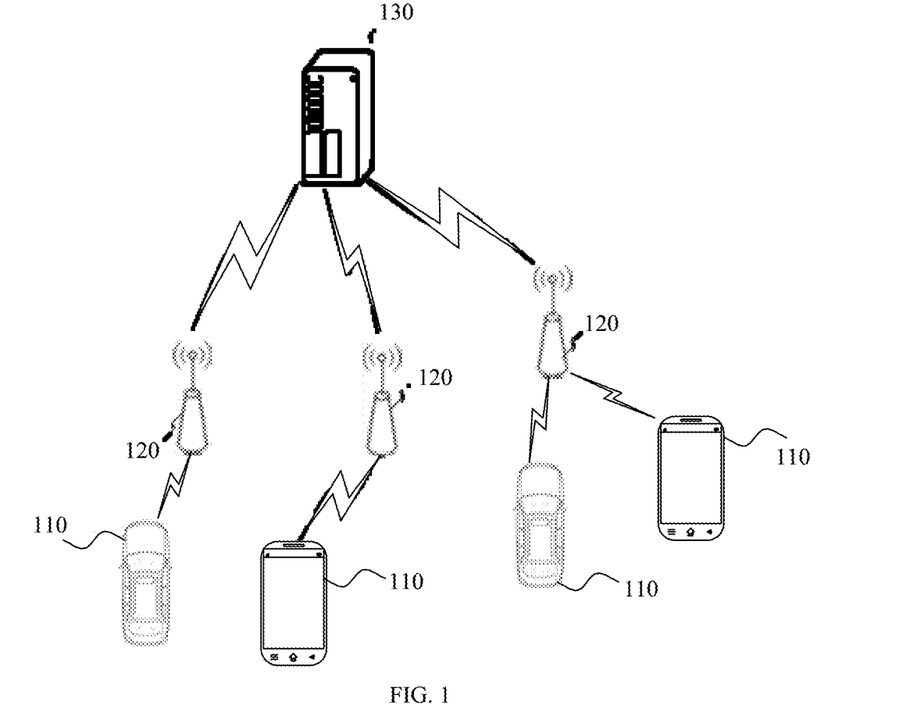
FIG. 1 is a scenario schematic diagram of an implementation environment related to a channel detection method for a shared spectrum provided in the examples of the present disclosure.

FIG. 1 shows a scenario schematic diagram of an implementation environment related to a channel detection method for a shared spectrum provided in the examples of the present disclosure. As shown in FIG. 1, the implementation environment may include: several terminals 110 and several base stations 120.

The terminal 110 is a wireless communication device supporting a plurality of wireless access technologies. For example, the terminal 110 may support a cellular mobile communication technology, such as a 4G technology and a 5G technology. Or, the terminal 110 may further support a next-generation mobile communication technology of the 5G technology.

For example, the terminal 110 may further be a customer terminal device, such as mobile telephone (also called a cellular telephone) and a computer with a mobile terminal, which may be a portable, pocket, handheld, built-in or vehicle-mounted mobile apparatus. The terminal may be a station (STA), a subscriber unit, a subscriber station, a mobile station, a mobile, a remote station, an access point, a remote terminal, an access terminal, a user terminal, a user agent, a user device or user equipment (UE). Specifically, the terminal 110 may be a smart phone, a tablet computer, an ebook reader or other mobile terminals, or may be smart glasses, a smart watch, a smart bracelet or other smart wearable devices.

Or, the terminal 110 may be a vehicular communication device, which may be, for example, a vehicle computer with a wireless communication function, or a wireless communication device connected with the vehicle computer.

Or, the terminal 110 may further be a roadside device, which may be, for example, a street lamp with a wireless communication function, a signal lamp, or other roadside devices.

The base station 120 may be a network side device in a wireless communication system. The wireless communication system may be a fourth-generation (4G) system, which is also called a long term evolution (LTE) system; or the wireless communication system may further be a 5G system, which is also called a new radio (NR) system. Or, the wireless communication system may further be a next-generation system of the 5G system.

The base station 120 may be an evolved node B (eNB) used in the 4G system. Or, the base station 120 may further be a next generation node B (gNB) with a central and distributed framework used in the 5G system. When using the central and distributed framework, the base station 120 usually comprises a central unit (CU) and at least two distributed units (DU). The central unit is provided with protocol stacks of a packet data convergence protocol (PDCP) layer, a radio link control (RLC) layer and a media access control (MAC) layer; and the distributed unit is provided with a protocol stack of a physical (PHY) layer. A specific implementation mode of the base station 120 is not limited in the examples of the present disclosure.

The base station 120 is in wireless connection with the terminal 110 by means of a wireless air interface. In different examples, the wireless air interface is a wireless air interface based on a 4G standard; or the wireless air interface is a wireless air interface based on a 5G standard, such as new radio; or the wireless air interface may further be a wireless air interface based a next-generation mobile communication network technology standard of 5G.

Optionally, the wireless communication system may further include a network management device 130.

The several base stations 120 are connected with the network management device 130. The network management device 130 may be a core network device in the wireless communication system, for example, the network management device 130 may be an mobility management entity (MME) in an evolved packet core (EPC). Or, the network management device may further be a serving gateway (SGW), a public data network gateway (PGW), a policy and charging rules function (PCRF), a home subscriber server (HSS) or other core network devices. An implementation form of the network management device 130 is not limited in the examples of the present disclosure.

In the implementation environment shown in FIG. 1, the base station may support communication based on the shared spectrum. In an unlicensed system, the base station needs to occupy a channel resource so as to conduct channel detection, and when the shared spectrum is busy, the base station further needs to continue to detect a channel state so as to occupy the shared spectrum more rapidly. In that case, the base station requires a large amount of electricity for detecting the channel state of the shared spectrum.

Figure 2:
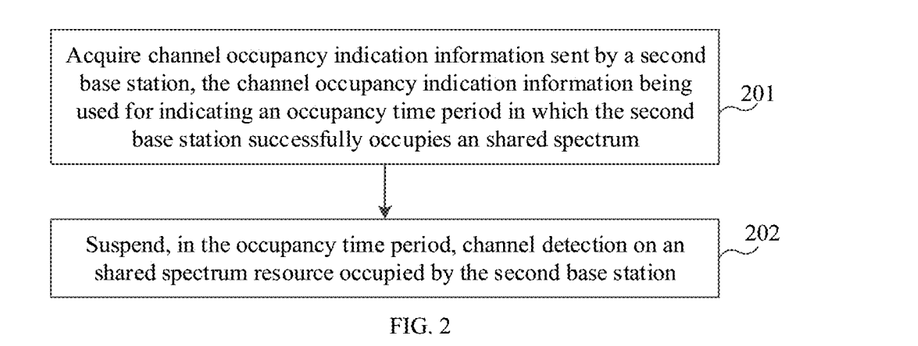
FIG. 2 is a method flow diagram of the channel detection method for a shared spectrum provided in the examples of the present disclosure.

FIG. 2 shows a method flow diagram of the channel detection method for a shared spectrum provided in the examples of the present disclosure. As shown in FIG. 2, the channel detection method for a shared spectrum may be applied in the implementation environment shown in FIG. 1, and executed by a first base station in the implementation environment, the first base station may be any base station in the implementation environment shown in FIG. 1, and the channel detection method for a shared spectrum may include the following steps.

In S201, channel occupancy indication information sent by a second base station is acquired, the channel occupancy indication information being used for indicating an occupancy time period in which the second base station successfully occupies the shared spectrum.

In S202, in the occupancy time period, channel detection on a shared spectrum resource occupied by the second base station is suspended.

Optionally, the second base station is any base station in a target base station set of the first base station; and before the channel occupancy indication information sent by the second base station is acquired, the method further comprises: base station information of each adjacent base station of the first base station is acquired; and the target base station set is acquired according to the base station information of the adjacent base station.

Optionally, the step that the base station information of each adjacent base station of the first base station is acquired comprises the following step that first information of the adjacent base station is acquired by means of a wired interface between the first base station and the adjacent base station, the first information including geographical position information of the adjacent base station; and the step that the target base station set is acquired according to the base station information of the adjacent base station comprises the following step that when the geographical position information of the adjacent base station indicates that a distance between the adjacent base station and the first base station is within a distance threshold value, the adjacent base station is added into the target base station set.

Optionally, the step that the base station information of each adjacent base station of the first base station is acquired comprises the following step that a wireless signal sent by the adjacent base station is measured to obtain second information of the adjacent base station, the second information including a first signal intensity, measured by the first base station, of the wireless signal sent by the adjacent base station; and the step that the target base station set is acquired according to the base station information of the adjacent base station comprises the following step that when the first signal intensity is larger than a first intensity threshold value, the adjacent base station is added into the target base station set.

Optionally, the step that the base station information of each adjacent base station of the first base station is acquired comprises the following step that base station measurement information reported by a terminal is received, the base station measurement information including a second signal intensity, measured by the terminal, of a wireless signal sent by the adjacent base station; and the step that the target base station set is acquired according to the base station information of the adjacent base station comprises the following step that when the second signal intensity is larger than a second intensity threshold value, the adjacent base station is added into the target base station set.

Optionally, the step that the channel occupancy indication information sent by the second base station is acquired comprises the following step that the channel occupancy indication information sent by the second base station is acquired by means of a wired interface between the first base station and the second base station.

Optionally, the step that the channel occupancy indication information sent by the second base station is acquired comprises the following steps that a wireless signal sent by the second base station is received; and the channel occupancy indication information carried in the wireless signal sent by the second base station is acquired.

Optionally, the step that the wireless signal sent by the second base station is received comprises the following step that when the first base station does not occupy the shared spectrum, the wireless signal sent by the second base station is received.

Optionally, the step that the wireless signal sent by the second base station is received comprises the following step that a physical layer control signal sent by the second base station is received.

Optionally, before the physical layer control signal sent by the second base station is received, the method further comprises the following step that a receiving parameter corresponding to the physical layer control signal sent by the second base station is acquired, the receiving parameter including at least one of time-frequency and position information, wave beam information, an aggregation degree level, a downlink control information (DCI) length, a detection frequency, a radio network temporary identifier and a cyclic redundancy check (CRC) code generation mode; and the step that the physical layer control signal sent by the second base station is received comprises the following step that the physical layer control signal sent by the second base station is received according to the receiving parameter.

Optionally, the step that the receiving parameter corresponding to the physical layer control signal sent by the second base station is acquired comprises the following step that the pre-configured receiving parameter is acquired; or the receiving parameter notified by the second base station by means of a signal is received.

Optionally, the method further comprises the following step that: according to the occupancy time period, a channel detection parameter used in detection on the shared spectrum after the occupancy time period by the first base station is adjusted.

In conclusion, according to the solution in the examples of the present disclosure, the first base station acquires the channel occupancy indication information, sent by the second base station, used for indicating the occupancy time period in which the second base station successfully occupies the shared spectrum; and then in the occupancy time period, the first base station suspends the channel detection on the shared spectrum resource occupied by the second base station. In other words, in the solution disclosed in the present disclosure, when determining that another base station is occupying a licensed channel, the base station does not conduct channel detection on the shared spectrum, shortening time of unnecessary detection on the shared spectrum and reducing electricity consumption of the base station.

Figure 3:
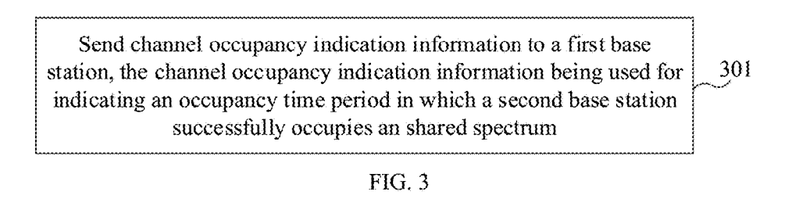
FIG. 3 is a method flow diagram of the channel detection method for a shared spectrum provided in the examples of the present disclosure.

FIG. 3 shows a method flow diagram of the channel detection method for a shared spectrum provided in the examples of the present disclosure. As shown in FIG. 3, the channel detection method for a shared spectrum may be applied in the implementation environment shown in FIG. 1, and executed by a second base station in the implementation environment, the second base station may be any base station in the implementation environment shown in FIG. 1, and the channel detection method for a shared spectrum may include the following steps.

In S301, channel occupancy indication information is sent to a first base station, the channel occupancy indication information being used for indicating an occupancy time period in which the second base station successfully occupies the shared spectrum.

In conclusion, according to the solution in the examples of the present disclosure, when the second base station successfully occupies the shared spectrum, the channel occupancy indication information indicating the occupancy time period in which the second base station successfully occupies the shared spectrum is sent to the first base station, so that in the occupancy time period, the first base station conveniently suspends channel detection on a shared spectrum resource occupied by the second base station. In other words, in the solution disclosed in the present disclosure, when determining that another base station is occupying a licensed channel, the base station does not conduct channel detection on the shared spectrum, shortening time of unnecessary detection on the shared spectrum and reducing electricity consumption of the base station.

Figure 4:
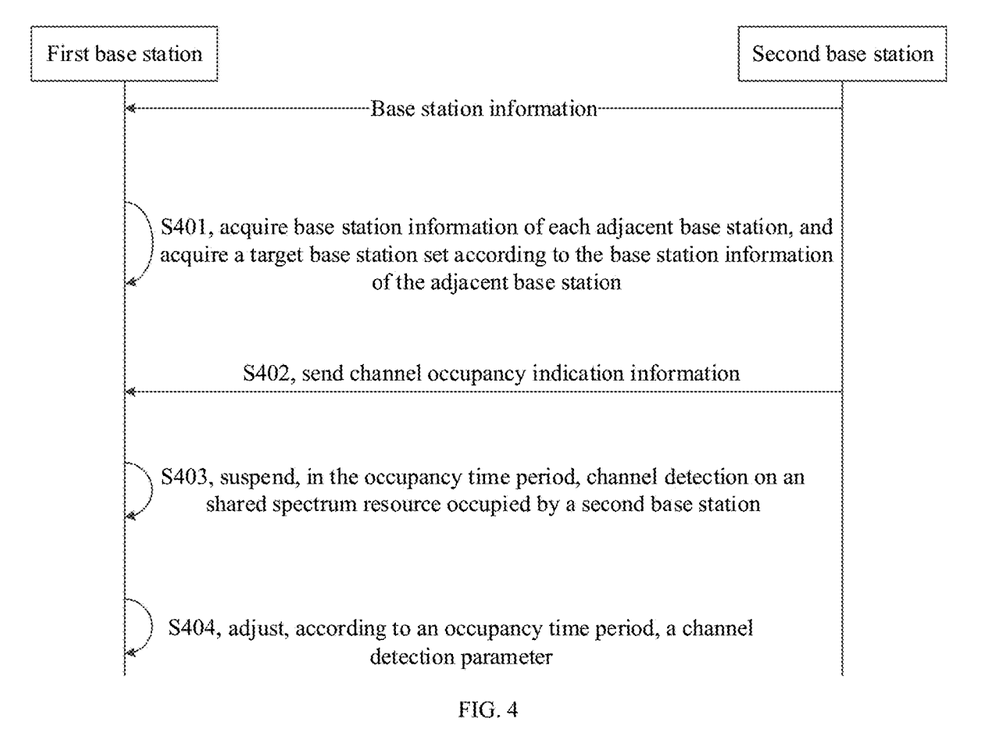
FIG. 4 is a method flow diagram of the channel detection method for a shared spectrum provided in the examples of the present disclosure.

FIG. 4 shows a method flow diagram of the channel detection method for a shared spectrum provided in the examples of the present disclosure. As shown in FIG. 4, the channel detection method for a shared spectrum may be applied in the implementation environment shown in FIG. 1, and executed by each base station in the implementation environment, and the channel detection method for a shared spectrum may include the following steps.

S401, a first base station acquires base station information of an adjacent base station, and acquires the target base station set according to the base station information of the adjacent base station.

1) In a possible implementation mode, when the base station information of each adjacent base station of the first base station is acquired and the target base station set is acquired according to the base station information of the adjacent base station, the first base station may acquire the first information of the adjacent base station by means of the wired interface between the first base station and the adjacent base station, the first information including geographical position information of the adjacent base station; and when the geographical position information of the adjacent base station indicates that the distance between the adjacent base station and the first base station is within the distance threshold value, the adjacent base station is added into the target base station set.

Optionally, the first information may further include an identifier of the adjacent base station, such as a base station ID.

In the implementation mode, the base station may establish a list of target base stations (that is, the target base station set) through an interaction with the adjacent base station, such as by means of the wired interface between the base stations, when starting to work or being working. The base stations may exchange first information with each other, the first information including the base station ID and geographical position information of the base station.

After one adjacent base station occupies the shared spectrum, if the adjacent base station is too close to the first base station, a signal sent by the adjacent base station may interfere in receiving and sending of data on the same resource by the first base station, and if the adjacent base station is far enough away from the first base station, the signal sent by the adjacent base station cannot interfere in receiving and sending of data on the same resource by the first base station. In view of this, after acquiring the first information of the adjacent base station, the first base station may determine the distance between the first base station and the adjacent base station by means of the geographical position information of the adjacent base station and the geographical position information of the first base station, and when the distance is larger than the distance threshold value, the adjacent base station may be determined to not interfere with the first base station when the adjacent base station and the first base station occupy the same shared spectrum, so the first base station does not need to pay attention to a situation of the adjacent base station occupying the shared spectrum; and on the contrary, when the distance is within the distance threshold value, the adjacent base station interferes with the first base station when the adjacent base station and the first base station occupy the same shared spectrum, so the first base station may add the adjacent base station into the target base station set of the first base station, for example, may add the base station ID of the adjacent base station into a list of target base stations of the first base station.

Accordingly, each base station in a system may acquire the first information of the adjacent base station and obtain a corresponding target base station set.

Figure 5:
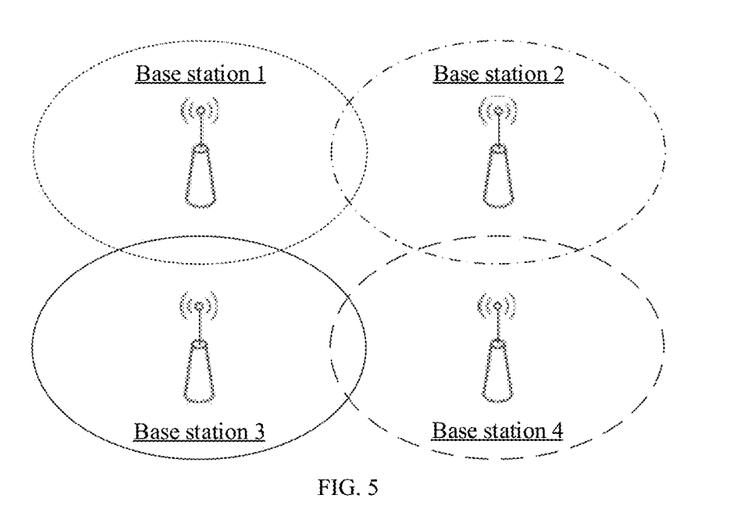
FIG. 5 is a schematic diagram of an adjacent base station related to the example shown in FIG. 4.

For example, FIG. 5 shows a schematic diagram of an adjacent base station related to the examples of the present disclosure. As shown in FIG. 5, in base stations 1-4 arranged in a rectangular shape, the two base stations at a diagonal are far away from each other, and the base stations at the same side are close to each other, for example, in FIG. 5, the base station 1 is close to the base station 2 and the base station 3, and far away from the base station 4. The base station 1 and the base station 4 exchange base station IDs and geographical position information (such as longitude and latitude coordinates) with each other by means of a wired interface, and each base station determines a target base station set thereof according to the received base station ID and geographical position information of an adjacent base station. The target base station set of the base station 1 is {base station 2, base station 3}; the target base station set of the base station 2 is {base station 1, base station 4}; the target base station set of the base station 3 is {base station 1, base station 4}; and the target base station set of the base station 4 is {base station 2, base station 3}.

2) In another possible implementation mode, when the base station information of each adjacent base station of the first base station is acquired and the target base station set is acquired according to the base station information of the adjacent base station, the first base station may measure the wireless signal sent by the adjacent base station to obtain the second information of the adjacent base station, the second information including the first signal intensity, measured by the first base station, of the wireless signal sent by the adjacent base station; and when the first signal intensity is larger than the first intensity threshold value, the adjacent base station is added into the target base station set.

Regarding two adjacent base stations, when an intensity of a wireless signal, received by the base station 1, sent by the base station 2 is high, the base station 2 may possibly interfere with the base station 1, and when the intensity of the wireless signal, received by the base station 1, sent by the base station 2 is low, the base station 2 cannot interfere with the base station 1. In the examples of the present disclosure, the first base station may determine a base station capable of sending a wireless signal with a high intensity to the first base station in the adjacent base stations as a target base station requiring attention. Therefore, in the implementation mode, the first base station may establish the target base station set by monitoring a transmission signal or channel of the adjacent base station, for example, when monitored transmission (that is, a signal intensity) of the adjacent base station is larger than a threshold, the base station is taken as a target base station in the target base station set.

3) In another possible implementation mode, when the base station information of each adjacent base station of the first base station is acquired and the target base station set is acquired according to the base station information of the adjacent base station, the first base station may receive the base station measurement information reported by the terminal, the base station measurement information including the second signal intensity, measured by the terminal, of the wireless signal sent by the adjacent base station; and when the second signal intensity is larger than the second intensity threshold value, the adjacent base station is added into the target base station set.

The terminal is a terminal accessing the first base station. Similar to the 2) implementation mode, when an intensity of a wireless signal, received by a terminal serviced by the base station 1, sent by the base station 2 is high, the base station 2 may possibly interfere in communication between the base station 1 and the terminal, and when the intensity of the wireless signal, received by the terminal serviced by the base station 1, sent by the base station 2 is low, the base station 2 cannot interfere in the communication between the base station 1 and the terminal. In the examples of the present disclosure, the first base station may determine a base station capable of sending a wireless signal with a high intensity to a terminal serviced by the first base station in the adjacent base stations as a target base station requiring attention.

In other words, the first base station may obtain the target base station set with assistance of the terminal, for example, the terminal reports information of each adjacent base station monitored by the terminal to a service base station (that is, the first base station), the information reported by the terminal comprises a base station ID, a signal type, a signal intensity, etc. monitored by the terminal, and the first base station acquires, based on the information reported by each terminal, an adjacent base station with the signal intensity, higher than a threshold, monitored by the terminal as a target base station in the target base station set.

In S402, when the second base station successfully occupies the shared spectrum, the second base station sends the channel occupancy indication information, and the first base station acquires the channel occupancy indication information sent by the second base station.

The channel occupancy indication information is used for indicating an occupancy time period in which the second base station successfully occupies the shared spectrum. The second base station is any base station in the target base station set.

In the examples of the present disclosure, each base station sending data by means of the shared spectrum needs to conduct channel detection on the shared spectrum by itself, and occupies the shared spectrum to send the data when detecting that the shared spectrum is idle.

In a system based on the shared spectrum, time of a sending end using the shared spectrum once is limited by means of maximum channel occupancy time (MCOT), that is, after the sending end conducts the channel detection once and successfully occupies the shared spectrum, the largest channel occupancy time does not exceed time defined by the MCOT.

In the examples of the present disclosure, after occupying the shared spectrum, the second base station may send the channel occupancy indication information to the first base station, and then the first base station may acquire the channel occupancy indication information sent by the second base station.

The second base station is one base station in the target base station set of the first base station, that is, the second base station is close enough to the first base station, so when the second base station occupies the shared spectrum, the first base station usually does not occupy the shared spectrum.

The channel occupancy indication information may include an ID of a channel occupancy side, channel occupancy start time and end time of channel occupancy this time, channel occupancy time, etc.

Optionally, after acquiring the target base station set, the first base station may send a notification to each base station (such as the second base station) in the target base station set so as to notify that the first base station is to be set as a target base station, after receiving the notification of the first base station, the second base station may record the first base station as a base station needing a notification of the channel occupancy indication information, and then after successfully occupying the shared spectrum, the second base station may send the channel occupancy indication information to the first base station; or after successfully occupying the shared spectrum, the second base station may further broadcast its channel occupancy indication information in a broadcast mode.

In a possible implementation mode, a first base station may acquire the channel occupancy indication information sent by the second base station by means of a wired interface between the first base station and the second base station, and accordingly, the second base station sends the channel occupancy indication information to the first base station by means of the wired interface between the first base station and the first base station.

In the implementation mode, the second base station may send the channel occupancy indication information to the first base station by means of the wired interface, or the second base station may further send the channel occupancy indication information to all the adjacent base stations including the first base station by means of the wired interface.

In a possible implementation mode, the second base station may carry the channel occupancy indication information by means of the wireless signal, and accordingly, the first base station may receive the wireless signal sent by the second base station and acquire the channel occupation indication information carried in the wireless signal sent by the second base station.

In the implementation mode, the second base station may send the channel occupancy indication information to the first base station by means of the wireless signal, or the second base station may further broadcast the channel occupancy indication information by means of the wireless signal.

Optionally, when not occupying the shared spectrum, the first base station may receive the wireless signal sent by the second base station.

In the examples of the present disclosure, when the second base station sends the channel occupancy indication information by means of the wireless signal, the first base station may choose whether to receive the wireless signal sent by the second base station according to a situation of the first base station occupying the shared spectrum. For example, when not occupying the shared spectrum, the first base station may choose to receive the wireless signal sent by the second base station, and when occupying the shared spectrum, the first base station does not need to receive the wireless signal sent by the second base station, reducing electricity consumption to a certain extent.

Optionally, the second base station may carry the channel occupancy indication information by means of the physical layer control signal, and accordingly, when receiving the wireless signal sent by the second base station, the first base station may receive the physical layer control signal sent by the second base station.

The physical layer control signal may be GC-PDCCH.

Optionally, before receiving the physical layer control signal sent by the second base station, the first base station may acquire the receiving parameter corresponding to the physical layer control signal sent by the second base station, the receiving parameter including at least one of the time-frequency and position information, the wave beam information, the aggregation degree level, the downlink control information (DCI) length, the detection frequency, the radio network temporary identifier and the cyclic redundancy check (CRC) code generation mode; and when receiving the physical layer control signal sent by the second base station, the first base station may receive the physical layer control signal sent by the second base station according to the receiving parameter.

Optionally, the step that the receiving parameter corresponding to the physical layer control signal sent by the second base station is acquired comprises the following step that the pre-configured receiving parameter is acquired; or the receiving parameter notified by the second base station by means of the signal is received.

All the receiving parameters may be pre-configured, or may further be notified to the first base station by the second base station by means of the signal; or part of the receiving parameters may be pre-configured, and other parameters may be notified to the first base station by the second base station by means of the signal.

For example, in the examples of the present disclosure, a system may pre-configure (or configure by means of a protocol) a method for receiving the physical layer control signal used for bearing the channel occupancy indication information, such as time-frequency and position information, wave beam information, an aggregation degree level, a DCI length, a detection frequency, etc. of sending occupancy. Or, the method for the physical layer control signal bearing the channel occupancy indication information may further be indicated to other base stations (including the first base station) needing to receive a signal by a base station sending the channel occupancy indication information (that is, the second base station), for example, after the first base station notifies to the second base station that the second base station is set as a target base station, the second base station sends a configuration signal to the first base station, the configuration signal including the time-frequency and position information, the wave beam information, the aggregation degree level, the DCI length, the detection frequency, etc. of the sending occupancy. The configuration signal may be a signal sent by means of the wired interface or a signal sent by means of a wireless interface.

Furthermore, the first base station may further require information such as RNTI on the GC-PDCCH and the CRC generation mode to detect the GC-PDCCH sent by the second base station. For example, in the examples of the present disclosure, a public RNTI for scrambling the GC-PDCCH, and a common CRC generation mode for transmitting the GC-PDCCH.

Or, the time-frequency and position information, the wave beam information, the aggregation degree level, the DCI length, the detection frequency, etc. of the sending occupancy may be defined in advance (by means of a system or protocol), and the RNTI and the CRC generation mode may be notified by the second base station by means of a signal.

In S403, in the occupancy time period in which the second base station successfully occupying the shared spectrum, the first base station suspends the channel detection on a shared spectrum resource occupied by the second base station.

In the examples of the present disclosure, when executing the channel detection according to a channel occupancy situation and finding that the second base station is occupying the shared spectrum, the first base station may not execute channel detection operation on the shared spectrum resource occupied by the first base station in time of the target base station occupying the channel (that is, the occupancy time period) according to time information in the channel occupancy situation.

In a system, a plurality of shared spectrum resources may be used, when the first base station occupies one of the plurality of shared spectrum resources, in time of the first base station occupying the shared spectrum, the second base station does not conduct the channel detection on the shared spectrum resource occupied by the first base station, but may conduct channel detection on other shared spectrum resources.

Optionally, the shared spectrum resource occupied by the first base station may be indicated according to the channel occupancy indication information. For example, the channel occupancy indication information may further include channel resource information, and the channel resource information may indicate the shared spectrum resource successfully occupied by the first base station.

Accordingly, after channel occupancy of the second base station is finished, when there is a need to send data on the shared spectrum, the first base station may conduct the channel detection on the shared spectrum again.

Figure 6:
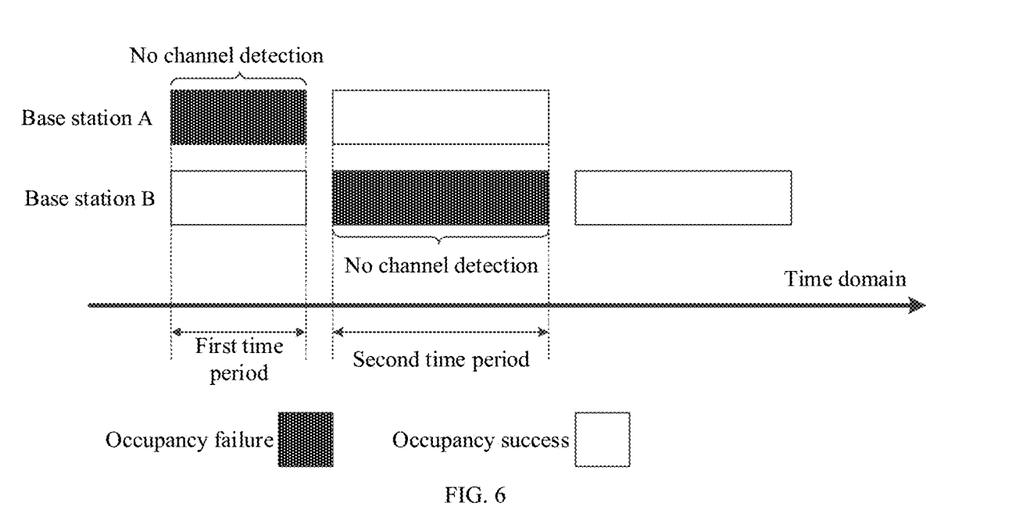
FIG. 6 is a schematic diagram of a time domain of occupying the shared spectrum related to the example shown in FIG. 4.

For example, FIG. 6 shows a schematic diagram of a time domain of occupying the shared spectrum related to the examples of the present disclosure. As shown in FIG. 6, when in a first time period, a base station A fails to occupy the shared spectrum and a base station B successfully occupies the shared spectrum, the base station A does not conduct channel detection on the shared spectrum in the first time period; and when in a second time period, the base station A successfully occupies the shared spectrum and the base station B fails to occupy the shared spectrum, the base station B does not conduct the channel detection on the shared spectrum in the second time period.

In S404, according to the occupancy time period, the first base station adjusts the channel detection parameter used in the detection on the shared spectrum after the occupancy time period by the first base station.

When the first base station restarts the channel detection, the channel detection parameter used by the first base station may keep unchanged, or the first base station may further adjust the channel detection parameter used later by the first base station according to last occupancy time of the second base station before restarting the channel detection.

The channel detection parameter may include detection start time, a type of channel detection, a priority of channel detection, etc.

Optionally, when adjusting, according to the occupation time period, the channel detection parameter used in the detection on the shared spectrum after the occupation time period by the first base station, the first base station may adjust a detection start timing of detection on the shared spectrum next time by the first base station according to the occupancy time period of the first base station. For example, the detection start timing of the channel detection next time by the first base station is moved forwards or delayed according to an occupancy time period of the second base station occupying the shared spectrum.

In conclusion, according to the solution in the examples of the present disclosure, when the second base station successfully occupies the shared spectrum, the channel occupancy indication information indicating the occupancy time period in which the second base station successfully occupies the shared spectrum is sent to the first base station, so that in the occupancy time period, the first base station conveniently suspends the channel detection on the shared spectrum resource occupied by the second base station. In other words, in the solution disclosed in the present disclosure, when determining that another base station is occupying a licensed channel, the base station does not conduct the channel detection on the shared spectrum, shortening time of unnecessary detection on the shared spectrum and reducing electricity consumption of the base station.

The following is examples of an apparatus of the present disclosure, which may be used for executing the examples of the method of the present disclosure. For details not disclosed in the examples of the apparatus of the present disclosure, please refer to the examples of the method of the present disclosure.

Figure 7:
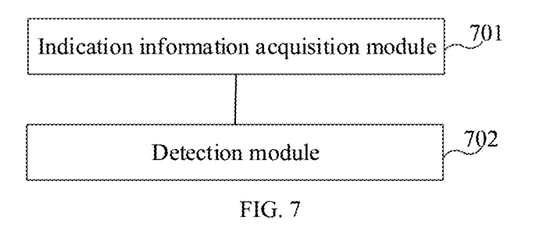
FIG. 7 is a block diagram of a channel detection apparatus for a shared spectrum shown in an example.

FIG. 7 is a block diagram of a channel detection apparatus for a shared spectrum shown in an example. As shown in FIG. 7, the channel detection apparatus for a shared spectrum may be implemented as the whole or part of the base station in the implementation environment shown in FIG. 1 in a mode of hardware or a combination of the hardware and software, so as to execute the steps, executed by a first base station, in any one example in FIG. 2 or 4. Optionally, the apparatus comprises: an indication information acquisition module 701 used for acquiring channel occupancy indication information sent by a second base station, the channel occupancy indication information being used for indicating an occupancy time period in which the second base station successfully occupies the shared spectrum; and a detection module 702 used for suspending, in the occupancy time period, channel detection on a shared spectrum resource occupied by the second base station.

Optionally, the second base station is any base station in a target base station set of the first base station; and the apparatus further comprises: a base station information acquisition module used for acquiring, before the indication information acquisition module acquires the channel occupancy indication information sent by the second base station, base station information of each adjacent base station of the first base station; and a set acquisition module used for acquiring the target base station set according to the base station information of the adjacent base station.

Optionally, the base station information acquisition module comprises: a first acquisition submodule used for acquiring first information of the adjacent base station by means of a wired interface between the first base station and the adjacent base station, the first information including geographical position information of the adjacent base station; and the set acquisition module comprises:

a first adding submodule used for adding, when the geographical position information of the adjacent base station indicates that a distance between the adjacent base station and the first base station is within a distance threshold value, the adjacent base station into the target base station set.

Optionally, the base station information acquisition module comprises: a second acquisition submodule used for measuring a wireless signal sent by the adjacent base station to obtain second information of the adjacent base station, the second information including a first signal intensity, measured by the first base station, of the wireless signal sent by the adjacent base station; and the set acquisition module comprises: a second adding submodule used for adding, when the first signal intensity is larger than a first intensity threshold value, the adjacent base station into the target base station set.

Optionally, the base station information acquisition module comprises: a third acquisition submodule used for receiving base station measurement information reported by a terminal, the base station measurement information including a second signal intensity, measured by the terminal, of a wireless signal sent by the adjacent base station; and the set acquisition module comprises: a third adding submodule used for adding, when the second signal intensity is larger than a second intensity threshold value, the adjacent base station into the target base station set.

Optionally, the indication information acquisition module is used for acquiring the channel occupancy indication information sent by the second base station by means of a wired interface between the first base station and the second base station.

Optionally, the indication information acquisition module is used for receiving a wireless signal sent by the second base station; and acquiring the channel occupancy indication information carried in the wireless signal sent by the second base station.

Optionally, the indication information acquisition module is used for receiving, when the first base station does not occupy the shared spectrum, the wireless signal sent by the second base station.

Optionally, when receiving the wireless signal sent by the second base station, the indication information acquisition module is used for receiving a physical layer control signal sent by the second base station.

Optionally, the apparatus further comprises: a receiving parameter acquisition module used for acquiring, before the indication information acquisition module receives the physical layer control signal sent by the second base station, a receiving parameter corresponding to the physical layer control signal sent by the second base station, the receiving parameter including at least one of time-frequency and position information, wave beam information, an aggregation degree level, a downlink control information (DCI) length, a detection frequency, a radio network temporary identifier and a cyclic redundancy check (CRC) code generation mode; and when receiving the physical layer control signal sent by the second base station, the indication information acquisition module being used for receiving, according to the receiving parameter, the physical layer control signal sent by the second base station.

Optionally, the receiving parameter acquisition module is used for acquiring the pre-configured receiving parameter; or receiving the receiving parameter notified by the second base station by means of a signal.

Optionally, the apparatus further comprises: a parameter adjustment module used for adjusting, according to the occupancy time period, a channel detection parameter used in detection on the shared spectrum after the occupancy time period by the first base station.

In conclusion, according to the solution in the examples of the present disclosure, the first base station acquires the channel occupancy indication information, sent by the second base station, used for indicating the occupancy time period in which the second base station successfully occupies the shared spectrum; and then in the occupancy time period, the first base station suspends the channel detection on the shared spectrum resource occupied by the second base station. In other words, in the solution disclosed in the present disclosure, when determining that another base station is occupying a licensed channel, the base station does not conduct channel detection on the shared spectrum, shortening time of unnecessary detection on the shared spectrum and reducing electricity consumption of the base station.

Figure 8:
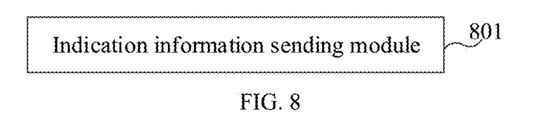
FIG. 8 is a block diagram of the channel detection apparatus for a shared spectrum shown in an example.

FIG. 8 is a block diagram of the channel detection apparatus for a shared spectrum shown in an example. As shown in FIG. 8, the channel detection apparatus for a shared spectrum may be implemented as the whole or part of the base station in the implementation environment shown in FIG. 1 in a mode of hardware or a combination of the hardware and software, so as to execute the steps, executed by a second base station, in any one example in FIG. 3 or 4. Optionally, the apparatus comprises: an indication information sending module 801 used for sending channel occupancy indication information to a first base station, the channel occupancy indication information being used for indicating an occupancy time period in which the second base station successfully occupies the shared spectrum.

In conclusion, according to the solution in the examples of the present disclosure, when the second base station successfully occupies the shared spectrum, the channel occupancy indication information indicating the occupancy time period in which the second base station successfully occupies the shared spectrum is sent to the first base station, so that in the occupancy time period, the first base station conveniently suspends channel detection on a shared spectrum resource occupied by the second base station. In other words, in the solution disclosed in the present disclosure, when determining that another base station is occupying a licensed channel, the base station does not conduct channel detection on the shared spectrum, shortening time of unnecessary detection on the shared spectrum and reducing electricity consumption of the base station.

It should be noted that the apparatus is described by taking only the functional modules as examples when achieving functions thereof, and in actual application, the functions may be achieved by different functional modules according to actual requirements, that is, a content structure of a device is divided into the different functional modules, so as to implement all or part of the functions described above.

For the apparatus in the above-mentioned example, a specific method for each module to execute an operation has been described in detail in the example relating to the method, and will not be repeated herein.

An example of the present disclosure provides the channel detection apparatus for a shared spectrum. The apparatus can be used in a first base station, and implements all or part of the steps, executed by the first base station, in the example in FIG. 2 or 4 of the present disclosure. The channel detection apparatus for a shared spectrum comprises: a processor and a memory used for storing an executable instruction of the processor, where the processor is configured to acquire channel occupancy indication information sent by a second base station, the channel occupancy indication information being used for indicating an occupancy time period in which the second base station successfully occupies the shared spectrum; and suspend, in the occupancy time period, channel detection on a shared spectrum resource occupied by the second base station.

Optionally, the second base station is any base station in a target base station set of the first base station; and before the channel occupancy indication information sent by the second base station is acquired, the method further comprises the following steps that base station information of each adjacent base station of the first base station is acquired; and the target base station set is acquired according to the base station information of the adjacent base station.

Optionally, the step that the base station information of each adjacent base station of the first base station is acquired comprises the following step that first information of the adjacent base station is acquired by means of a wired interface between the first base station and the adjacent base station, the first information including geographical position information of the adjacent base station; and the step that the target base station set is acquired according to the base station information of the adjacent base station comprises the following step that when the geographical position information of the adjacent base station indicates that a distance between the adjacent base station and the first base station is within a distance threshold value, the adjacent base station is added into the target base station set.

Optionally, the step that the base station information of each adjacent base station of the first base station is acquired comprises the following step that a wireless signal sent by the adjacent base station is measured to obtain second information of the adjacent base station, the second information including a first signal intensity, measured by the first base station, of the wireless signal sent by the adjacent base station; and the step that the target base station set is acquired according to the base station information of the adjacent base station comprises the following step that when the first signal intensity is larger than a first intensity threshold value, the adjacent base station is added into the target base station set.

Optionally, the step that the base station information of each adjacent base station of the first base station is acquired comprises the following step that base station measurement information reported by a terminal is received, the base station measurement information including a second signal intensity, measured by the terminal, of a wireless signal sent by the adjacent base station; and the step that the target base station set is acquired according to the base station information of the adjacent base station comprises the following step that when the second signal intensity is larger than a second intensity threshold value, the adjacent base station is added into the target base station set.

Optionally, the step that the channel occupancy indication information sent by the second base station is acquired comprises the following step that the channel occupancy indication information sent by the second base station is acquired by means of a wired interface between the first base station and the second base station.

Optionally, the step that the channel occupancy indication information sent by the second base station is acquired comprises the following steps that a wireless signal sent by the second base station is received; and the channel occupancy indication information carried in the wireless signal sent by the second base station is acquired.

Optionally, the step that the wireless signal sent by the second base station is received comprises the following step that when the first base station does not occupy the shared spectrum, the wireless signal sent by the second base station is received.

Optionally, the step that the wireless signal sent by the second base station is received comprises the following step that a physical layer control signal sent by the second base station is received.

Optionally, before the physical layer control signal sent by the second base station is received, the method further comprises the following step that a receiving parameter corresponding to the physical layer control signal sent by the second base station is acquired, the receiving parameter including at least one of time-frequency and position information, wave beam information, an aggregation degree level, a downlink control information (DCI) length, a detection frequency, a radio network temporary identifier and a cyclic redundancy check (CRC) code generation mode; and the step that the physical layer control signal sent by the second base station is received comprises the following step that the physical layer control signal sent by the second base station is received according to the receiving parameter.

Optionally, the step that the receiving parameter corresponding to the physical layer control signal sent by the second base station is acquired comprises the following step that the pre-configured receiving parameter is acquired; or the receiving parameter notified by the second base station by means of a signal is received.

Optionally, the processor is further configured to adjust, according to the occupancy time period, a channel detection parameter used in detection on the shared spectrum after the occupancy time period by the first base station.

An example of the present disclosure provides the channel detection apparatus for a shared spectrum. The apparatus is used in a second base station, and can implement all or part of the steps, executed by the second base station, in the example in FIG. 3 or 4 of the present disclosure. The channel detection apparatus for a shared spectrum comprises: a processor and a memory used for storing an executable instruction of the processor, where the processor is configured to send channel occupancy indication information to a first base station, the channel occupancy indication information being used for indicating an occupancy time period in which the second base station successfully occupies the shared spectrum.

The above describes the solution provided in the examples of the present disclosure mainly by taking the first base station and the second base station as examples. It may be understood that in order to achieve the functions, the first base station and the second base station include corresponding hardware structures and/or software modules executing all the functions. By combining modules and algorithm steps of all the examples described in the examples disclosed in the present disclosure, the examples of the present disclosure can be achieved in a mode of hardware or a combination of hardware and computer software. Whether some function is executed in a mode of hardware or of driving hardware by computer software depends on a specific application and design constraints of the technical solution. Those skilled in the art can use different methods to implement the described functions for each particular application, but such implementation should not be considered to be beyond the scope of the technical solution of the examples of the present disclosure.

Figure 9:
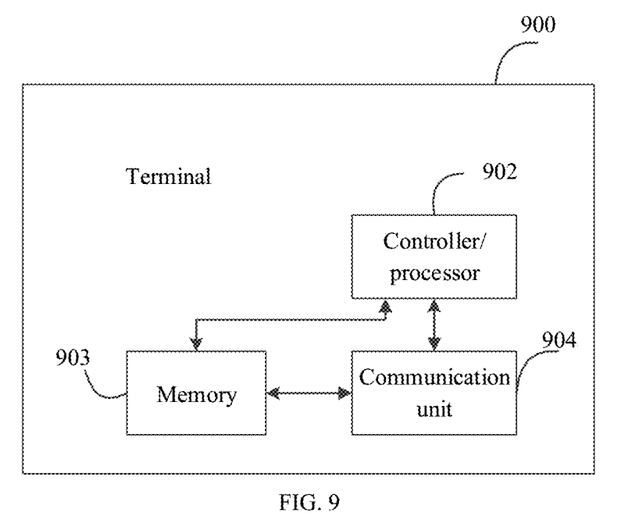
FIG. 9 is a structural schematic diagram of a base station shown in an example.

FIG. 9 is a structural schematic diagram of a base station shown in an example.

The base station 900 comprises a communication unit 904 and a processor 902. The processor 902 may further be a controller, which is shown as a "controller/processor 902" in FIG. 9. The communication unit 904 is used for supporting communication between the base station and other network devices (such as other base stations, terminals and gateways).

Furthermore, the base station 900 may further include a memory 903, and the memory 903 is used for storing a procedure code and data of the base station 900.

It may be understood that FIG. 9 only shows a simplified design of the base station 900. In actual application, the base station 900 may include any number of processors, controllers, memories, communication units, etc., and all the base station capable of achieving the examples of the present disclosure are within the scope of protection of the examples of the present disclosure.

Those skilled in the art should note that in the above one or more examples, the functions described in the examples of the present disclosure may be achieved by means of hardware, software, firmware or any combination thereof. When the functions are achieved by means of software, they may be stored in a computer readable storage medium or serve as one or more instructions or codes on a computer readable medium to be transmitted. The computer readable medium comprises a computer storage medium and a communication medium, the communication medium including any medium facilitating transfer of a computer program from one place to another place. The storage medium may be any usable medium capable of being stored and taken by a general-purpose computer or a special-purpose computer.

The examples of the present disclosure further provide a computer storage medium, which is used for storing a computer executable instruction used by the base station. A processor in the base station calls the executable instruction to implement all or part of the steps, executed by a first base station, in the channel detection method for a shared spectrum.

The examples of the present disclosure further provide a computer storage medium, which is used for storing a computer executable instruction used by the base station. A processor in the base station calls the executable instruction to implement all or part of the steps, executed by a second base station, in the channel detection method for a shared spectrum.

Those skilled in the art could easily conceive of other implementation solutions of the present disclosure upon consideration of the specification and the disclosure disclosed in the implementation. The present disclosure is intended to cover any variations, uses or adaptive changes of the present disclosure, which follow the general principles of the present disclosure and include common general knowledge or conventional technical means, which is not disclosed in the present disclosure, in the art. The specification and the examples are to be regarded as example only, and the true scope and spirit of the present disclosure are indicated by the following claims.

It should be understood that the present disclosure is not limited to a precise structure which has been described above and illustrated in the accompanying drawings, and can have various modifications and changes without departing from the its scope. The scope of the present disclosure is limited by the appended claims only.

The invention claimed is:

1. A channel detection method for a shared spectrum, wherein the channel detection method is executed by a first base station and comprises:
   acquiring channel occupancy indication information sent by a second base station, the channel occupancy indication information being used for indicating an occupancy time period in which the second base station successfully occupies the shared spectrum, wherein the second base station is a base station in a target base station set of the first base station, and a signal sent by the base station interferes in receiving and sending of data on a same resource by the first base station when the base station and the first base station occupy a same shared spectrum; and
   suspending, in the occupancy time period, channel detection on a shared spectrum resource occupied by the second base station.

2. The channel detection method according to claim 1, wherein before the acquiring channel occupancy indication information sent by the second base station, the channel detection method further comprises:
   acquiring base station information of an adjacent base station of the first base station; and
   acquiring the target base station set according to the base station information of the adjacent base station.

3. The channel detection method according to claim 2, wherein
   acquiring base station information of an adjacent base station of the first base station comprises:
   acquiring first information of the adjacent base station by means of a wired interface between the first base station and the adjacent base station, the first information comprising geographical position information of the adjacent base station; and
   acquiring the target base station set according to the base station information of the adjacent base station comprises:
      adding, when the geographical position information of the adjacent base station indicates that a distance between the adjacent base station and the first base station is within a distance threshold value, the adjacent base station into the target base station set.

4. The channel detection method according to claim 2, wherein
   acquiring base station information of an adjacent base station of the first base station comprises:
   measuring a wireless signal sent by the adjacent base station to obtain second information of the adjacent base station, the second information comprising a first signal intensity, measured by the first base station, of the wireless signal sent by the adjacent base station; and
   acquiring the target base station set according to the base station information of the adjacent base station comprises:
      adding, when the first signal intensity is larger than a first intensity threshold value, the adjacent base station into the target base station set.

5. The channel detection method according to claim 2, wherein
   acquiring base station information of each adjacent base station of the first base station comprises:
   receiving base station measurement information reported by a terminal, the base station measurement information comprising a second signal intensity, measured by the terminal, of a wireless signal sent by the adjacent base station; and
   acquiring the target base station set according to the base station information of the adjacent base station comprises:
      adding, when the second signal intensity is larger than a second intensity threshold value, the adjacent base station into the target base station set.

6. The channel detection method according to claim 1, wherein acquiring channel occupancy indication information sent by a second base station comprises:
   acquiring the channel occupancy indication information sent by the second base station by means of a wired interface between the first base station and the second base station.

7. The channel detection method according to claim 1, wherein acquiring channel occupancy indication information sent by a second base station comprises:
   receiving a wireless signal sent by the second base station; and
   acquiring the channel occupancy indication information carried in the wireless signal sent by the second base station.

8. The channel detection method according to claim 7, wherein receiving the wireless signal sent by the second base station comprises:
   executing, when the first base station does not occupy the shared spectrum, a step of the receiving a wireless signal sent by the second base station.

9. The channel detection method according to claim 8, wherein receiving the wireless signal sent by the second base station comprises:
   receiving a physical layer control signal sent by the second base station.

10. The channel detection method according to claim 9, wherein before the receiving a physical layer control signal sent by the second base station, the channel detection method further comprises:
acquiring a receiving parameter corresponding to the physical layer control signal sent by the second base station, the receiving parameter comprising at least one of time-frequency and position information, wave beam information, an aggregation degree level, a downlink control information (DCI) length, a detection frequency, a radio network temporary identifier and a cyclic redundancy check (CRC) code generation mode; and
receiving the physical layer control signal sent by the second base station comprises:
receiving the physical layer control signal sent by the second base station according to the receiving parameter.

11. The channel detection method according to claim 10, wherein acquiring the receiving parameter corresponding to the physical layer control signal sent by the second base station comprises:
acquiring a pre-configured receiving parameter; or
receiving the receiving parameter notified by the second base station by means of a signal.

12. The channel detection method according to claim 1, the channel detection method further comprising:
adjusting, according to the occupancy time period, a channel detection parameter used in detection on the shared spectrum after the occupancy time period by the first base station.

13. A channel detection method for a shared spectrum, wherein the channel detection method is executed by a second base station and comprises:
sending channel occupancy indication information to a first base station, the channel occupancy indication information being used for indicating an occupancy time period in which the second base station successfully occupies the shared spectrum, wherein the second base station is a base station in a target base station set of the first base station, and a signal sent by the base station interferes in receiving and sending of data on a same resource by the first base station when the base station and the first base station occupy a same shared spectrum.

14. A channel detection apparatus for a shared spectrum, wherein the channel detection apparatus is used in a first base station, and the channel detection apparatus comprises:
at least one processor, and
a non-transitory, computer-readable storage medium for storing instructions that, when executed by the at least one processor, cause the at least one processor to:
acquire channel occupancy indication information sent by a second base station, the channel occupancy indication information being used for indicating an occupancy time period in which the second base station successfully occupies the shared spectrum, wherein the second base station is a base station in a target base station set of the first base station, and a signal sent by the base station interferes in receiving and sending of data on a same resource by the first base station when the base station and the first base station occupy a same shared spectrum; and
suspend, in the occupancy time period, channel detection on a shared spectrum resource occupied by the second base station.

15. The channel detection apparatus according to claim 14, wherein the at least one processor is further configured to:
acquire, before acquire the channel occupancy indication information sent by the second base station, base station information of an adjacent base station of the first base station; and
acquire the target base station set according to the base station information of the adjacent base station.

16. The channel detection apparatus according to claim 15, wherein the at least one processor is further configured to acquire base station information of the adjacent base station of the first base station by:
acquiring first information of the adjacent base station by means of a wired interface between the first base station and the adjacent base station, the first information comprising geographical position information of the adjacent base station; and the processor further configured to acquire the target base station set according to the base station information of the adjacent base station by:
adding, when the geographical position information of the adjacent base station indicates that a distance between the adjacent base station and the first base station is within a distance threshold value, the adjacent base station into the target base station set.

17. The channel detection apparatus according to claim 15, wherein the at least one processor is further configured to acquire base station information of the adjacent base station of the first base station by:
measuring a wireless signal sent by the adjacent base station to obtain second information of the adjacent base station, the second information comprising a first signal intensity, measured by the first base station, of the wireless signal sent by the adjacent base station; and the processor further configured to acquire the target base station set according to the base station information of the adjacent base station by:
adding, when the first signal intensity is larger than a first intensity threshold value, the adjacent base station into the target base station set.

18. The channel detection apparatus according to claim 15, wherein the at least one processor is further configured to acquire base station information of the adjacent base station of the first base station by:
receiving base station measurement information reported by a terminal, the base station measurement information comprising a second signal intensity, measured by the terminal, of a wireless signal sent by the adjacent base station; and the processor further configured to acquire the target base station set according to the base station information of the adjacent base station by:
adding, when the second signal intensity is larger than a second intensity threshold value, the adjacent base station into the target base station set.

19. A channel detection apparatus for a shared spectrum, wherein the channel detection apparatus is used in a second base station, and the channel detection apparatus comprises:
one or more processors, and
a non-transitory computer-readable storage medium for storing instructions executable by the one or more processors, wherein the one or more processors are configured to perform the channel detection method for a shared spectrum according to claim 13.

20. A non-transitory computer readable storage medium storing computer-executable instructions that, when executed by one or more computer processors, cause the one or more computer processors to perform the channel detection method for a shared spectrum according to claim 1.

* * * * *